United States Patent Office

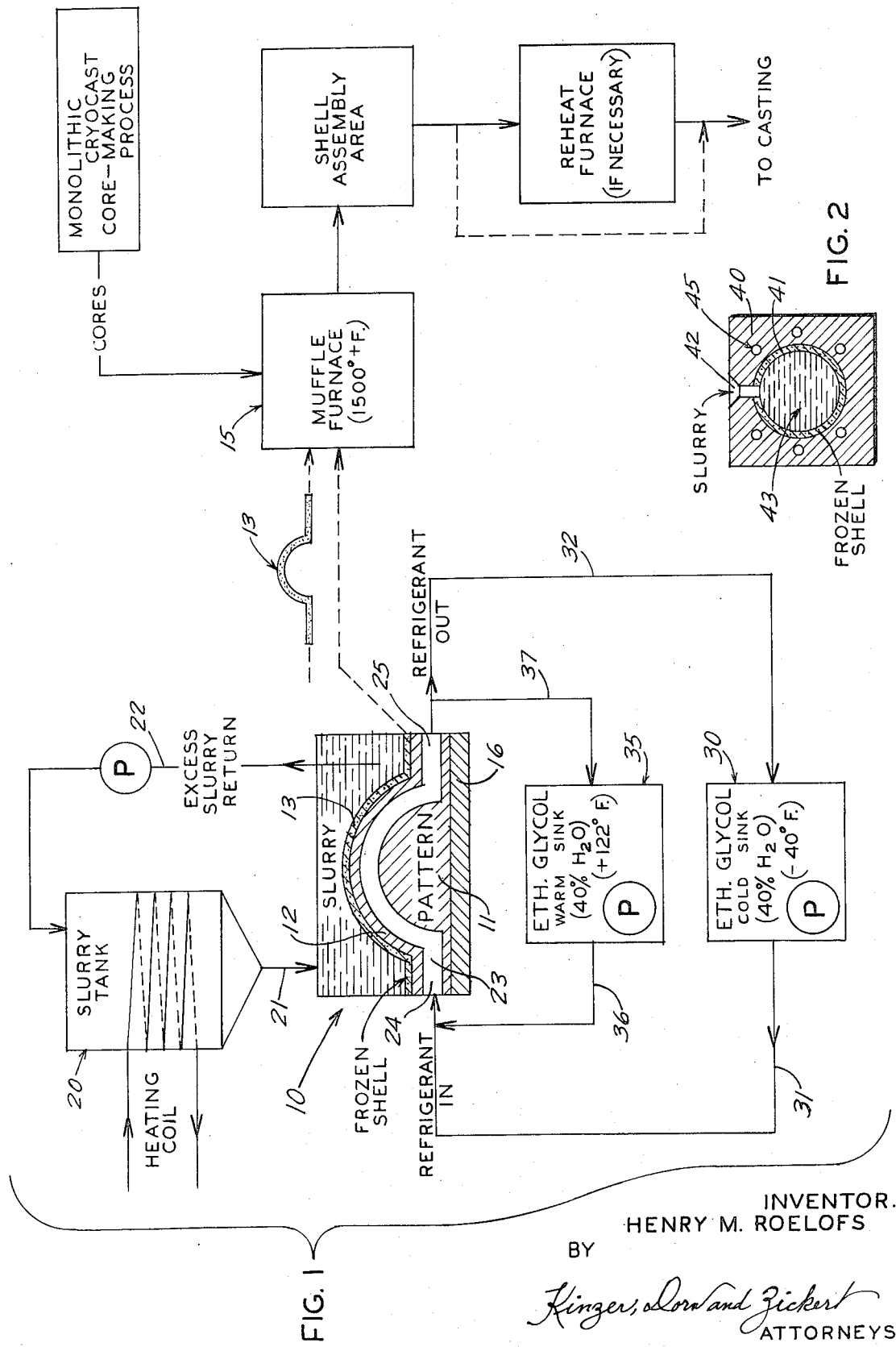

3,816,572
Patented June 11, 1974

3,816,572
CERAMIC ARTICLES
Henry M. Roelofs, Chicago, Ill., assignor to Nalco
Chemical Company, Chicago, Ill.
Filed Aug. 26, 1971, Ser. No. 175,053
Int. Cl. B05b 3/00
U.S. Cl. 264—28     5 Claims

ABSTRACT OF THE DISCLOSURE

Ceramic shapes are produced cryogenically by in effect submerging a pattern in a slurry presenting the ceramic and circulating a refrigerant through the pattern to freeze the layer of slurry in contact with the replicating surface of the pattern, after which excess slurry is withdrawn and the frozen shell and pattern are separated. Freezing is continued for a short period after the slurry is withdrawn, the pattern is warmed after separation and steps may be taken to maintain the supply of slurry at a constant temperature.

---

This invention relates to the production of ceramic articles by immersing a pattern in a slurry presenting the ceramic, freezing the slurry and afterwards firing the frozen body to produce the ultimate, hardened shape.

A process for producing ceramic shapes by freezing a ceramic slurry in contact with a pattern is disclosed in U.S. Letters Patent No. 3,512,571 and the copending application of Cutler and Roelofs, Ser. No. 86,876, filed Nov. 4, 1970. The slurry is preferably a stable mixture of an aqueous colloidal silica sol and a refractory powder which is bondable by the precipitated sol. A pattern which is a replica of a shape to be produced is invested by the slurry and the slurry is frozen while in contact therewith. This may be accomplished by placing the pattern in a flask, pouring the slurry into the flask at room temperature and imposing thereon a low temperature sufficient to transform the aqueous content of the slurry into ice crystals precipitating irreversibly at the same time silica constituting a binder or matrix for the finely divided ceramic particles. Afterwards the frozen shell and pattern are separated and the shell is fired resulting in fusion or at least interfacial diffusion between the ceramic particles and the precipitated silica sufficient to produce a finished, high strength ceramic body.

The foregoing recapitulates the disclosure of Pat. 3,512,571. It is believed the reason why the frozen shell may be fired in its cold state without encountering unacceptable cracks or fissures is that the ice crystals presented by the cold, frozen shell grew perpendicular to all surfaces of the pattern during the freezing operation, presenting natural vent paths for escaping steam during the firing operation.

The foregoing copending application is supplemental to the patent in that the process of so freezing a slurry to produce a frozen shell is extended and rendered more useful by utilizing a hollow pattern which permits a refrigerant to traverse the interior of the pattern. This accounts for a rapid and uniform chill of the slurry, beginning with and progressing outward of the interface film of slurry in contact with the replicating surface of the pattern. The present invention was evolved as a result of further study of the hollow pattern feature of the aforesaid copending application which has been established as an effective mode of obtaining rapid and uniform freezing.

Thus it is an object of the present invention to continue freezing of the shell after excess unfrozen slurry has been withdrawn from the flask. The reason for this is to assure that the shell when fired is uniformly in a solid phase. Another object of this invention is to eliminate accumulations of frost on the pattern, after the frozen shell has been separated therefrom, since by so proceeding it is found that this is responsible for preventing dimensional changes in the shell next to be formed and is responsible for eliminating spalling at the face of the shell in contact with the replicating surface of the pattern.

A further object of the present invention is to develop a system for continuously producing frozen ceramic shapes in compliance with the foregoing objects and to so apply such a system as to prevent precipitation or degradation of an aqueous silica sol in a slurry reservoir in spite of the fact that the reservoir supply will be constantly replenished by excess slurry taken from the freezing flask; to deliver the frozen shell to a muffle furnace for firing essentially in a dry condition and to accomplish this by continuing to circulate refrigerant through the hollow pattern after excess slurry has been withdrawn; and to eliminate formation of frost on the pattern by circulating a warm fluid through the pattern after the shell has been stripped, the warming fluid and the refrigerant being chemically identical.

Other and further objects of the present invention will be apparent from the following description and claims and are illustrated in the accompanying drawing which, by way of illustration, shows a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawing:

FIG. 1 is a diagrammatic and partly schematic flow sheet showing the process of the present invention for producing an open faced ceramic article of simplified form; and FIG. 2 is a schematic view showing the manner in which a quite different shape may be produced in accordance with the present invention.

Referring to the drawing, FIG. 1, a flask 10 contains a permanent pattern 11 which is preferably of aluminum. Other permanent patterns may be used as well, such as stainless steel, but aluminum is the preference because of its compatability with the cryogenic environment herein involved, particularly from the standpoint of dimensional and surface integrity.

The pattern presents an exterior surface 12 which is a replica of the ceramic shape to be produced. This shape is identified as the ceramic article 13 shown in a stage of movement from the flask 10 to a muffle furnace 15.

The pattern in the flask rests on a back-up plate 16 disposed at the bottom of the flask 10. The remainder of the flask 10, in the volume above the replicating surface 12, is to be filled with a slurry containing ceramic constituents composing the shell-shaped article 13.

The slurry may be of the constituency disclosed in U.S. Letters Patent No. 3,512,571, essentially a suspension of approximately 30% finely divided fused silica of −100 to −200 mesh size and 70% colloidal silica sol, such as Nalcoag 1050 supplied by Nalco Chemical Company.

The slurry is normally contained in a tank or reservoir 20 positioned above the flask 10 so that the slurry may be delivered to the tank 10 by gravity flow through a conduit 21. The amount of slurry so delivered to the flask is that which covers entirely the highest part of the pattern to a depth equal to the thickness of the shell to be formed. This takes only several seconds.

Following formation of the shell on the pattern 11 and incidental to separating the frozen shell from the pattern as hereinafter described, excess (unfrozen) slurry may be pumped from the flask through a return conduit 22 and re-delivered to the reservoir tank 20. This step of divesting the flask, and therefore the shell, of unfrozen slurry takes approximately six minutes.

The pattern 11 is hollow. In fact, in the complicated form, the interior of the pattern will be constructed to present a plurality of labyrinths or reverse bending channels to enable refrigerant to be circulated therethrough uniformly to chill the replicating surface 12 of the pattern. In the present instance, in the simplified form shown, the channel is afforded simply by hollowing the pattern at 23. In any event, the channel at the interior of the pattern is of such form as to allow both an ingress point 24 and an egress point 25 for a refrigerant which may be ethylene glycol (40% $H_2O$) at —40° F. contained in a cold sink reservoir 30. Refrigerant is pumped from the cold sink 30 through a conduit 31 to the ingress point 24 of the pattern. The refrigerant leaves the pattern at egress point 25 and returns to the cold sink through the return conduit 32. It requires approximately six minutes to freeze a shell to a thickness of one-quarter of an inch, after which the excess slurry is returned to the tank. However, before stripping the frozen shell, circulation of refrigerant is continued for several minutes until the exterior of the shell is perfectly dry, that is, devoid of wet slurry.

It is found that when the frozen shell is stripped from the pattern frost tends to form on the pattern interfering with good interfacial contact with the slurry delivered to the pattern in the next cycle of operation, resulting in unacceptable dimensional variations. Such frosting is avoided by sequencing a warm fluid through the channel 23 of the pattern, after the frozen shell is removed, to impart a temperature of more than 32° F. to the pattern. Conveniently the warming fluid is ethylene glycol (40% $H_2O$ as aforesaid) chemically identical to the refrigerant, contained in a separate reservoir or warm sink 35, at about 122° F. Since the refrigerant and the warming fluid are identical in kind, the supply and return conduits 36 and 37 for the warming fluid may be connected to the supply and return conduits 31 and 32 for the refrigerant.

The ejected shell 13, separated from the pattern which remains in the flask, is delivered to the muffle furnace 15 where it is fired at 1500° F. to 1900° F. for a time sufficient to produce the desired ceramic bond between the precipitated silica and the fine grain constituent represented by the fused silica.

The critical temperature for the slurry is 15° F., which is to say that when this temperature is reached the sol becomes unstable and extremely fine grained silica is irreversibly precipitated. This is the phenomenon which occurs in the course of freezing the slurry in contact with the cryogenic pattern. Nonetheless the slurry is a very poor conductor of heat, and it is only the layer of slurry, in contact with the freezing increment, which attains a temperature below critical temperature. Therefore the unfrozen or excess slurry is above critical temperature, although that part nearest the frozen shell will be near critical temperature, and in order that a continuous process may be effectively adopted, either the slurry tank 20 or the returnd conduit 22 for excess slurry is heated, under thermostat controls, so that the slurry in the tank will be at a constant temperature.

The process is also applicable to the formation of hollow, spherical ceramic bodies. As shown in FIG. 2, a split flask 40 (clamping not shown) presents an internal pattern 41 of two 180° segments. A pouring spout 42 is afforded at the top of the flask 40 permitting slurry 43 to be supplied to the internal volume encompassed by the pattern segments. The flask is provided with channels 45 enabling refrigerant, and warming fluid as well, to be circulated therethrough in compliance with the process described in more detail above. Again, a ceramic shell of say one-quarter inch thickness is developed by the cryogenics within the flask 40. Afterwards, the flask may be inverted to drain excess slurry; the chill is continued to remove all excess wetness, as determined by the applicable time factor, and the flask is disassembled incidental to separating the pattern segments from the frozen shell which is then delivered to the muffle furnace.

I claim:
1. A process for producing ceramic articles of shell form comprising:
   (a) placing in a flask a permanent pattern having a surface which is a replica of the shell, said pattern having a channel to enable a refrigerant to be circulated therethrough;
   (b) investing the replicating surface of the flask-implaced pattern with an aqueous slurry of silica containing the ceramic;
   (c) circulating a refrigerant through the channel of the pattern until the investing slurry freezes on the replicating surface into a shell of acceptable thickness and thereupon divesting the flask of unfrozen slurry;
   (d) separating the frozen shell from the pattern and firing the separated shell to fuse the ceramic and silica to complete the article; and
   (e) warming the pattern to above 32° F. by circulating a warming fluid through the channel of the pattern to evaporate frost from the replicating surface of the pattern to prepare the pattern for a repetition of the foregoing steps.

2. A process according to claim 1 wherein the slurry is furnished to the flask from a reservoir, the excess slurry being returned to the reservoir, and warming the slurry in the reservoir at a constant temperature.

3. A process according to claim 2 wherein circulation of refrigerant is continued, after divestment of excess slurry, for a time sufficient to freeze any occluded slurry on the shell.

4. A process according to claim 1 wherein the warming fluid and the refrigerant are identical fluids.

5. A process according to claim 1 wherein the ceramic is fused silica and wherein the firing temperature for the separated shell is in the range of 1500–1900° F.

References Cited

UNITED STATES PATENTS

| | | | |
|---|---|---|---|
| 2,837,768 | 6/1958 | Talalay | 264—28 |
| 2,804,653 | 9/1957 | Talalay | 264—28 |
| 3,512,571 | 5/1970 | Phelps | 264—28 UX |
| 3,177,161 | 4/1965 | Smith-Johannsen | 264—28 X |
| 3,220,102 | 11/1965 | Lieberman | 264—28 X |

DONALD T. ARNOLD, Primary Examiner

U.S. Cl. X.R.

264—66, 235, 237